US007798296B2

(12) United States Patent
Iwashita

(10) Patent No.: US 7,798,296 B2

(45) Date of Patent: Sep. 21, 2010

(54) DAMPER DEVICE AND MANUFACTURING METHOD FOR DAMPER DEVICE

(75) Inventor: Hiroyuki Iwashita, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 182 days.

(21) Appl. No.: 11/248,924

(22) Filed: Oct. 11, 2005

(65) Prior Publication Data

US 2006/0081430 A1 Apr. 20, 2006

(30) Foreign Application Priority Data

Oct. 15, 2004 (JP) ............................. 2004-301288

(51) Int. Cl.
*F16D 57/00* (2006.01)

(52) U.S. Cl. ...................................................... 188/290

(58) Field of Classification Search ................. 188/290, 188/292, 294, 308, 309
See application file for complete search history.

(56) References Cited

U.S. PATENT DOCUMENTS

| | | | | | |
|---|---|---|---|---|---|
| 2,406,927 | A | * | 9/1946 | Tabb | 92/163 |
| 3,424,448 | A | * | 1/1969 | Chak Ma | 267/35 |
| 4,182,953 | A | * | 1/1980 | Hurley et al. | 250/231.16 |
| 4,316,145 | A | * | 2/1982 | Tann | 324/207.26 |
| 4,838,527 | A | * | 6/1989 | Holley | 267/64.28 |
| 4,914,757 | A | * | 4/1990 | Johnson | 4/224 |
| 5,152,189 | A | * | 10/1992 | Miura et al. | 464/180 |
| 5,547,047 | A | * | 8/1996 | Kohar et al. | 188/59 |
| 6,213,881 | B1 | * | 4/2001 | Sasa et al. | 464/24 |
| 6,390,255 | B2 | * | 5/2002 | Kobori et al. | 188/290 |
| 6,725,984 | B2 | * | 4/2004 | Orita | 188/290 |
| 6,729,448 | B2 | * | 5/2004 | Takahashi | 188/294 |
| 7,111,712 | B2 | * | 9/2006 | Orita | 188/296 |
| 7,322,450 | B2 | * | 1/2008 | Orita | 188/296 |
| 2002/0007993 | A1 | * | 1/2002 | Kobori et al. | 188/290 |
| 2003/0126717 | A1 | * | 7/2003 | Iwashita | 16/82 |
| 2003/0150678 | A1 | * | 8/2003 | Iwashita | 188/296 |
| 2003/0234145 | A1 | * | 12/2003 | Iwashita | 188/290 |
| 2006/0011427 | A1 | * | 1/2006 | Fukuzawa | 188/290 |
| 2006/0081430 | A1 | * | 4/2006 | Iwashita | 188/290 |

* cited by examiner

*Primary Examiner*—Bradley T King
*Assistant Examiner*—Thomas Irvin
(74) *Attorney, Agent, or Firm*—Frommer Lawrence & Haug LLP

(57) ABSTRACT

A damper device having a casing with a cylindrical inner circumferential surface, a shaft body located in the cylindrical space of the casing and supported in a freely turnable manner, a cover which seals the casing, and viscous fluid stored in a sealed space formed between the shaft body and the casing. The casing is provided with a first engagement part and a second engagement part which engage with the cover, and the cover is welded with the first engagement part by ultrasonic welding and positioned by the second engagement part which is used as a positioning part in an axial direction for the cover.

8 Claims, 7 Drawing Sheets

(A)

(B)

DAMPER DEVICE AND MANUFACTURING METHOD FOR DAMPER DEVICE

CROSS-REFERENCE TO RELATED APPLICATIONS

This application claims priority to Japanese Application No. 2004-301288 filed Oct. 15, 2004, which is incorporated herein by reference.

FIELD OF THE INVENTION

The present invention relates to a damper device utilizing fluid pressure and a manufacturing method for the damper device.

BACKGROUND OF THE INVENTION

In recent years, a damper device has been used which is mechanically connected to a toilet seat or a toilet lid of a Western type toilet by taking into consideration of user's convenience when the toilet seat or the toilet lid is opened or closed.

In the damper device, a rotor shaft is disposed in the inside of a casing and oil (viscous fluid) is stored in a sealed space formed between the rotor shaft and the casing. The sealed space is formed by the casing incorporated with a cover after the rotor shaft is inserted into the inside of the casing and oil is stored between the rotor shaft and the casing (see, for example, Japanese Patent Laid-Open No. 2001-54490).

However, in a conventional damper device, the casing and the cover are fixed to each other with screws. Therefore, portions for fixing screws are protruded outward in a radial direction from the casing and the cover and thus the size of a damper device is enlarged in the radial direction. Further, screws are necessary for the fixing portions and thus the number of component parts increases.

In order to solve the above-mentioned problem, it is conceivable that the casing and the cover are fixed by ultrasonic welding instead of fixing with a screw. However, when ultrasonic welding is performed with the horn of an ultrasonic welding device abutting with the end face of the cover in an axial direction, the casing is crushed in the axial direction and the end face of the cover for forming the sealed space may be pushed. Therefore, a stable gap space is not obtained which is formed between the rotor shaft disposed in the inside of the casing and the end face of the cover. In the worst case, the rotor shaft and the end face of the cover abut with each other to cause malfunction of the rotor shaft.

SUMMARY OF THE INVENTION

In view of the problems described above, it is an object and advantage of the present invention to provide a damper device which is capable of preventing a casing and a cover from increasing its diameter in a radial direction by fixing the casing and the cover each other with ultrasonic welding and capable of restricting the dispersion of damper operation by stabilizing a gap space between a turnable shaft and the end face of the cover, and to provide a manufacturing method for a damper device.

In order to achieve the above object and advantage, according to an embodiment of the present invention, there is provided a damper device including a casing provided with an inner circumferential surface formed in a cylindrical shape, a shaft body (turnable shaft) located in the cylindrical space of the casing and supported in a freely turnable manner, a cover which seals the casing, and viscous fluid stored in a sealed space formed between the shaft body and the casing. The casing is provided with a first and a second engagement parts engaging with the cover and the cover is welded with the first engagement part by ultrasonic welding and the second engagement part is used as a positioning part in an axial direction for the cover.

In this case, it is preferable to be constructed such that the shaft body is provided with a large diameter part which is positioned on the sealed space side of the first and the second engagement parts of the casing and an O-ring for sealing is disposed between the cylindrical inner circumferential surface of the casing and the large diameter part of the shaft body. According to the construction described above, sealing between the inner circumferential surface of the casing and the shaft body is performed on the sealed space side of the casing from the welded portion by ultrasonic welding and the positioning part of the cover in the axial direction which are the first and the second engagement parts. Therefore, the sealed space between the shaft body and the casing can be surely formed.

In addition, it is preferable to be constructed such that the cylindrical inner circumferential surface of the casing includes a first inner circumferential surface which forms the sealed space in which the viscous fluid is stored, a second inner circumferential surface which faces the large diameter part of the shaft body, and a third inner circumferential surface along which an insert part formed in the cover is inserted into the casing. Further, a first stepped part is formed between the first inner circumferential surface and the second inner circumferential surface so that the second inner circumferential surface has a larger diameter than a diameter of the first inner circumferential surface, and a second stepped part is formed between the second inner circumferential surface and the third inner circumferential surface so that the third inner circumferential surface has a larger diameter than a diameter of the second inner circumferential surface. According to the construction described above, since the second stepped part is formed between the second inner circumferential surface and the third inner circumferential surface, effects due to the ultrasonic welding can be cut off at the second stepped part and effects to the sealing between the inner circumferential surface of the casing and the large diameter part of the shaft body can be prevented. In addition, since the first stepped part is also formed between the first inner circumferential surface and the second inner circumferential surface, effects due to the ultrasonic welding are not transmitted to the sealed space where the viscous fluid is stored.

In accordance with an embodiment of the present invention, it is preferable that the cover is engaged with the second engagement part, i.e., the positioning part through a washer which is made of material different from the cover. According to the construction described above, vibration energy at the time of ultrasonic welding is cut off by the washer made of a different material from the cover and thus transmission of the vibration energy to the casing can be prevented. Therefore, since the casing is not melted and crushed in the axial direction, the cover can be prevented from being pushed furthermore in the axial direction. For example, in the case that the cover and the casing are made of PBT, the washer may be formed by using PTFE. Preferably, when the washer is made of metal, transmission of vibration energy to the casing can be surely prevented.

In accordance with an embodiment of the present invention, it is preferable that the washer is disposed so as to be adjacent to the end face in the axial direction of the shaft body. According to the construction described above, since a washer is disposed at a boundary portion between the end face of the shaft body and the cover, concentration of vibration energy to the boundary portion is prevented and thus welding between the end face of the shaft body and the cover can be surely restricted. Further, wear between the end face of the shaft body and the cover can be prevented by the washer.

In accordance with an embodiment of the present invention, at least an inwardly protruded portion is formed so as to be protruded inward from the inner circumferential surface of the casing such that a gap space is formed between a body part of the shaft body and the inwardly protruded portion. Further, in accordance with an embodiment of the present invention, at least an outwardly protruded portion is formed so as to be protruded outward from the body part of the shaft body such that a gap space is formed between the inner circumferential surface of the casing and the outwardly protruded portion. In addition, in accordance with an embodiment of the present invention, a gap space is formed between the inner circumferential surface of the casing and the outwardly protruded portion at a position where a gap space is formed between the inwardly protruded portion and the body part of the shaft body. According to the construction described above, since ultrasonic welding is performed at the position where a gap space is formed between the body part of the shaft body and the inwardly protruded portion, welding between the inwardly protruded portion and the body part of the shaft body can be prevented. Further, when ultrasonic welding is performed at the position where a gap space is formed between the outwardly protruded portion and the inner circumferential surface of the casing, welding between the outwardly protruded portion and the inner circumferential surface of the casing can be prevented. In addition, when ultrasonic welding is performed at the position where a gap space is formed between the body part of the shaft body and the inwardly protruded portion and a gap space is formed between the outwardly protruded portion and the inner circumferential surface of the casing, welding between the inwardly protruded portion and the body part of the shaft body and welding between the outwardly protruded portion and the inner circumferential surface of the casing can be prevented.

In an embodiment of the present invention, the cover is provided with an insert part which is to be inserted into the casing and a large diameter part having a larger diameter than the insert part. The insert part of the cover is inserted till a position where the axial end face of the large diameter part of the cover abut with the first engagement part formed on an opening part of the casing and, at this position, ultrasonic welding is performed with a horn of an ultrasonic welding device abutting with the cover to melt the large diameter part of the cover. The insert part of the cover is pushed into the casing in the axial direction along the an inner circumferential surface of the casing till abutting with the second engagement part through a washer and, as a result, the cover is positioned through the washer by the second engagement part of the casing.

In an embodiment of the present invention, a cross-sectional shape in a direction perpendicular to the axial direction of the inner circumferential surface of the casing is formed in a non-circular shape so that a gap space between the outwardly protruded portion of the shaft body and the inner circumferential surface of the casing is varied along a circumferential direction. Further, in an embodiment of the present invention, a cross-sectional shape in a direction perpendicular to the axial direction of the body part of the shaft body is formed in a non-circular shape so that a gap space between the inwardly protruded portion of the casing and the body part of the shaft body is varied along a circumferential direction. According to the construction described above, even when a turning torque of a turning member to which the damper device is connected is varied in a turning direction, the turning member can be moved at an arbitrary speed by setting a bumper torque corresponding to the variation of the turning torque. For example, in the case that the turning member is a toilet lid, damage due to the collision of the toilet lid to a toilet stool can be prevented by turning the toilet lid slowly at a roughly equal speed.

As described above, according to a damper device in an embodiment of the present invention, the casing is provided with a first engagement part and a second engagement part for engaging with the cover and the cover is welded with the first engagement part by ultrasonic welding and the second engagement part is used as a positioning part in an axial direction for the cover. Therefore, even when the first engagement part of the casing is melted at the time of ultrasonic welding, the cover is positioned by the second engagement part and prevented from being pushed furthermore in the axial direction. In other words, the cover is prevented from being pushed into a sealed space. Therefore, the gap space between the turnable shaft disposed in the sealed space and the end face of the cover can be stably formed in a designed dimension and thus dispersion of damper operation can be restricted.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 5(A) shows the state where the toilet seat 5 is completely opened, FIG. 5(B) shows the state where the toilet seat 5 is closed to a midway position, FIG. 5(C) shows the state where the toilet seat 5 is completely closed, and FIG. 5(D) is a cross-sectional view showing the state where the toilet seat 5 is at the position shown in FIG. 5(B).

FIG. 6(A) shows the state where the toilet seat 5 is at its closed position, FIG. 6(B) shows the state where the toilet seat 5 is opened to a midway position, FIG. 6(C) shows the state where the toilet seat 5 is completely opened, and FIG. 6(D) is a cross-sectional view showing the state where the toilet seat 5 is at the position shown in FIG. 6(B).

DETAILED DESCRIPTION OF THE PREFERRED EMBODIMENTS

An embodiment of the present invention will be described below with reference to the accompanying drawings.

Figure 1:
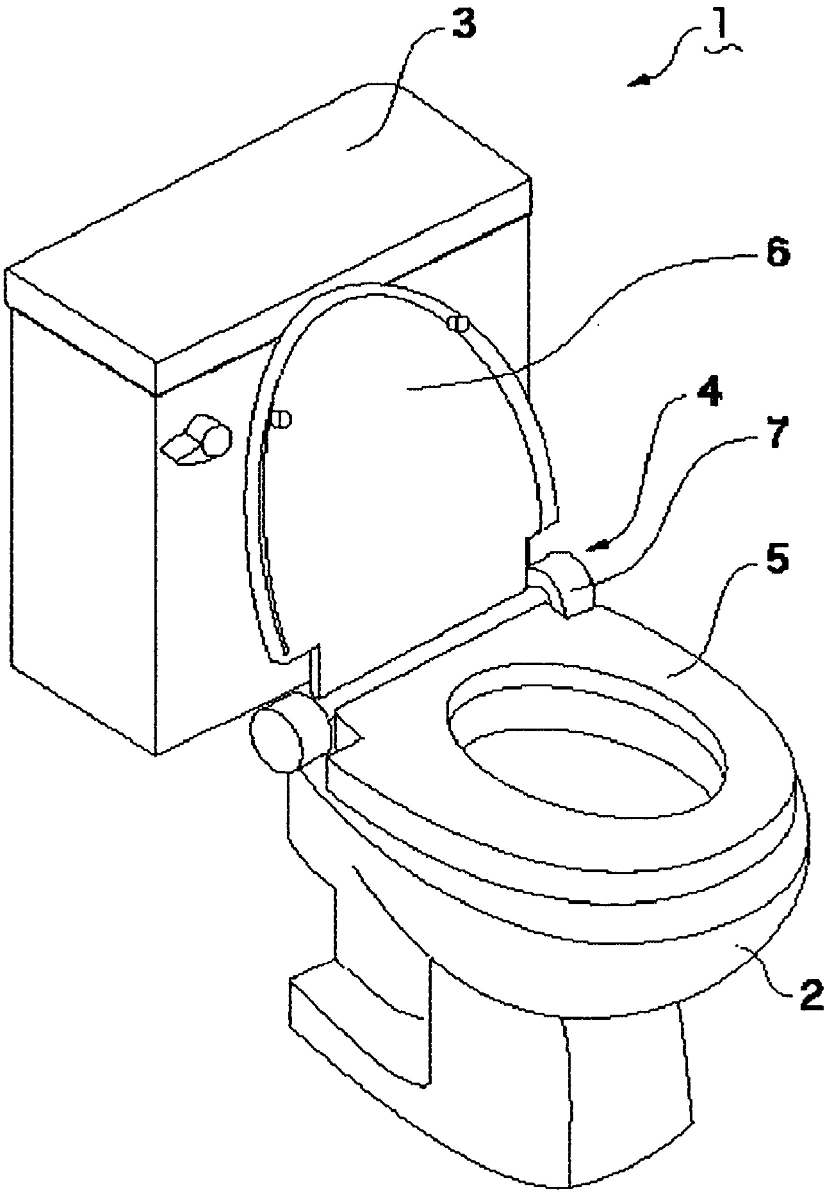
FIG. 1 is an explanatory view of a Western type toilet in which a damper device in accordance with an embodiment of the present invention is used for opening and closing a toilet seat.
Figure 2:
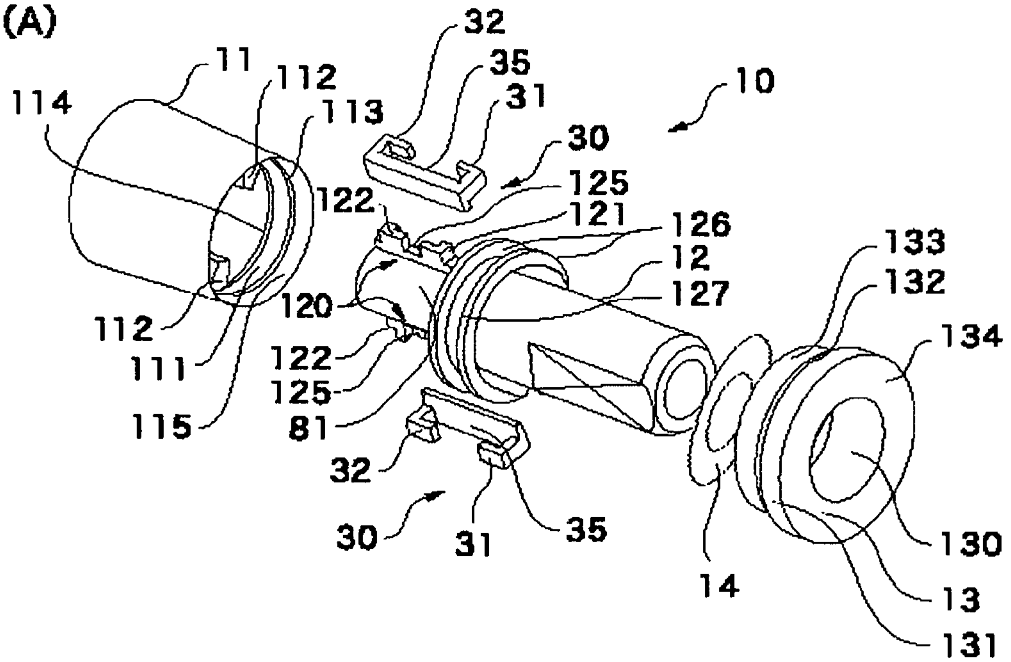
FIG. 2(A) is an exploded perspective view of a damper device in accordance with an embodiment of the present invention and FIG. 2(B) is its cross-sectional view.
Figure 2:
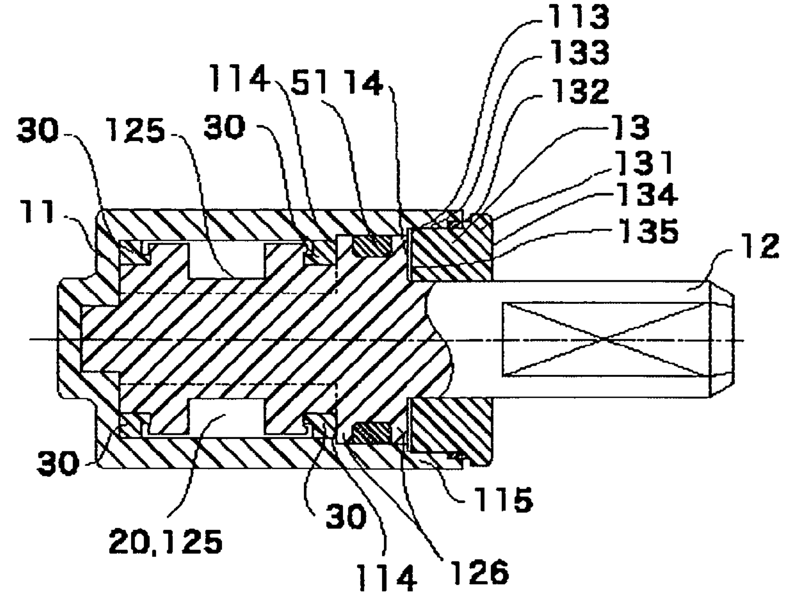
Figure 3:
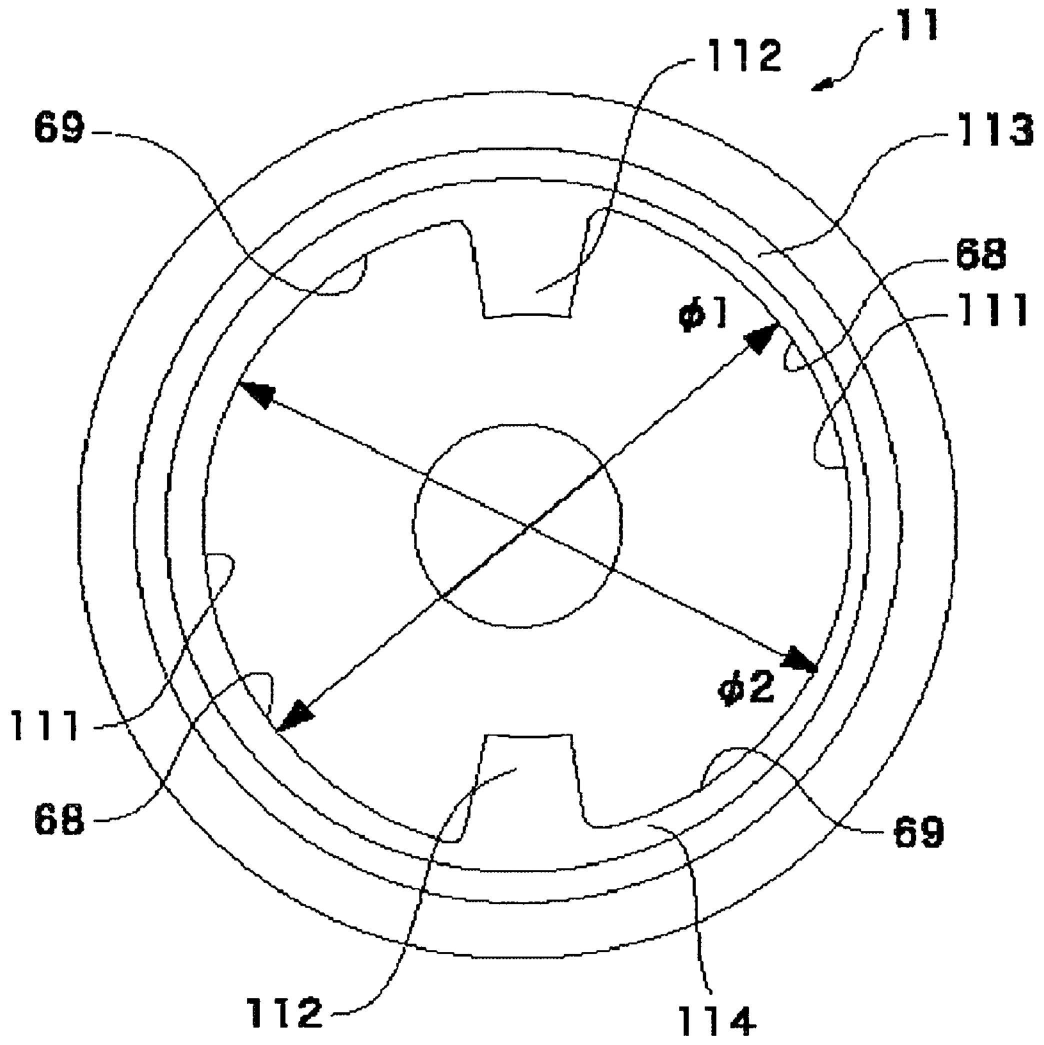
FIG. 3 is a front view showing the inside of the case of a damper device in accordance with an embodiment of the present invention.
Figure 4:
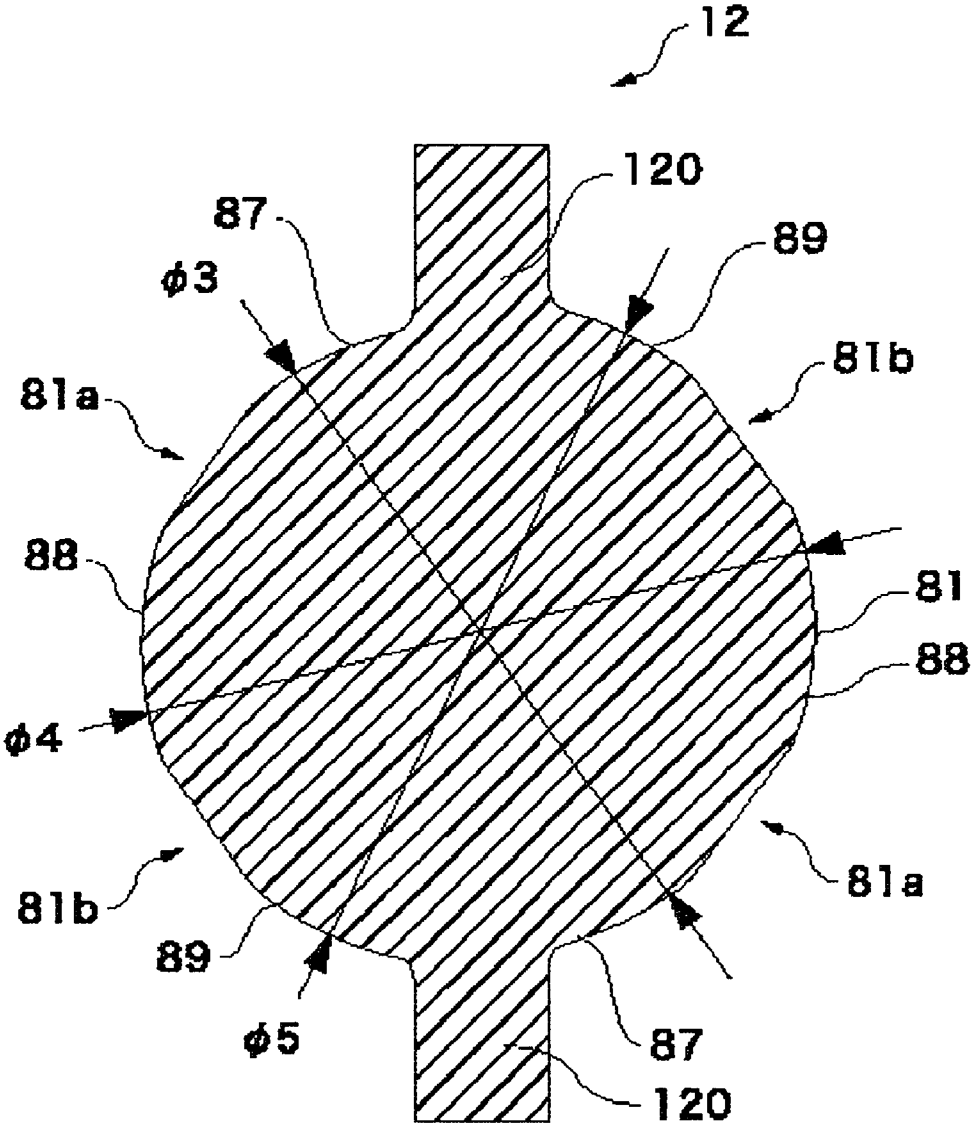
FIG. 4 is a cross-sectional view of a turnable shaft of a damper device in accordance with an embodiment of the present invention.
Figure 5:
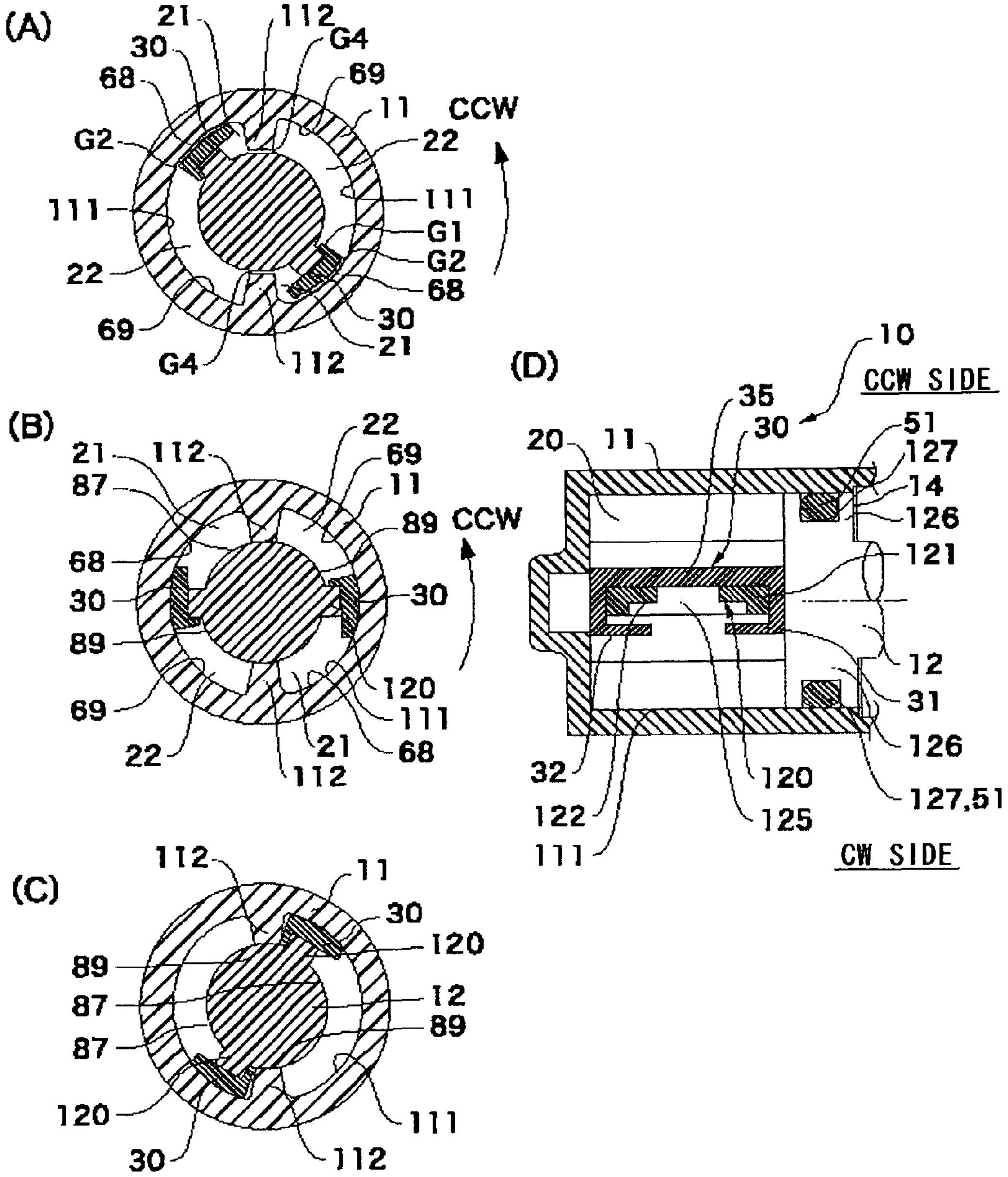
FIGS. 5(A) through 5(D) are explanatory views showing different states of a sealed space when an erected toilet seat is closed in the damper device shown in FIG. 2.
Figure 6:
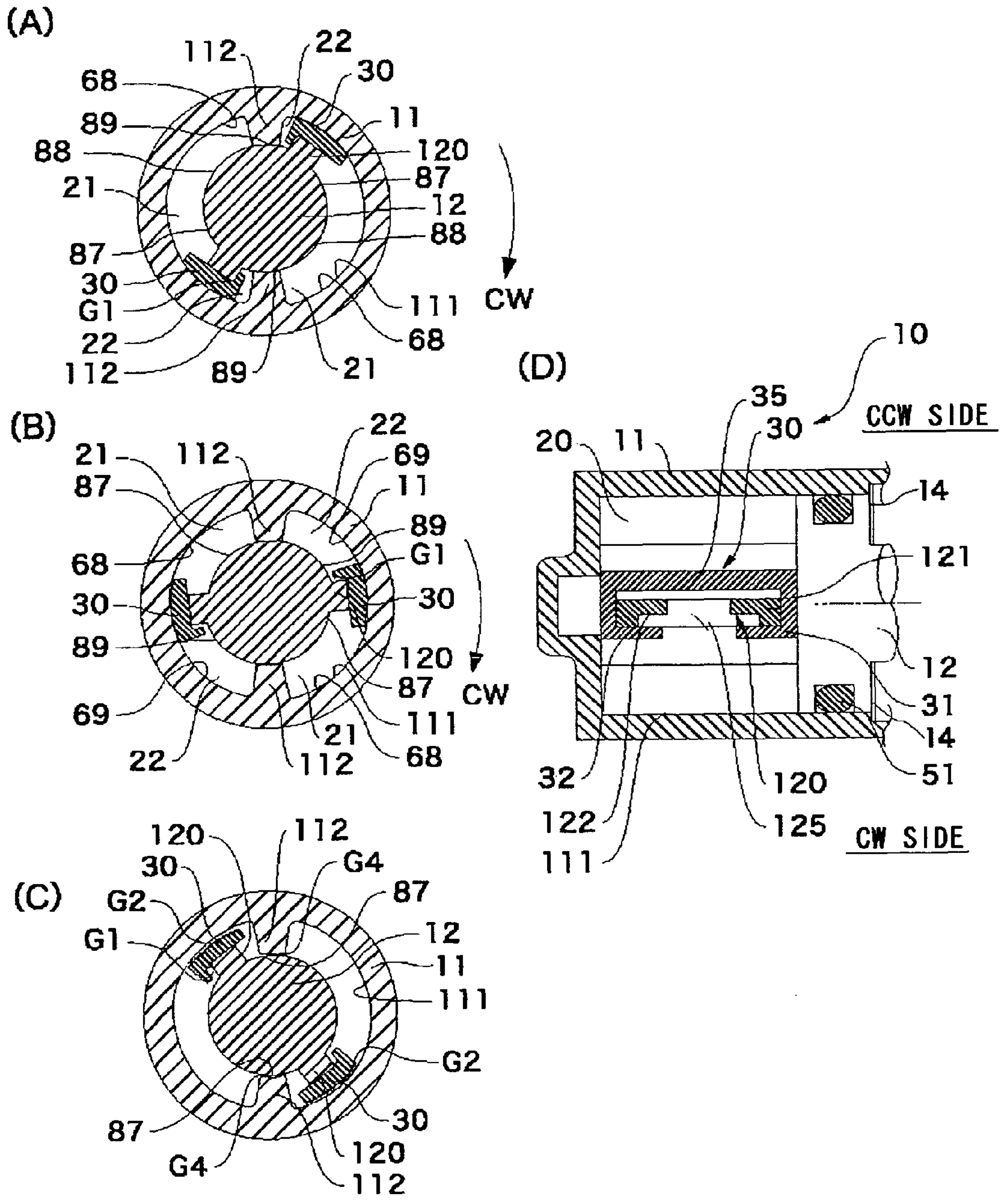
FIG. 6(A) through 6(D) are explanatory views showing different states of the sealed space when a closed toilet seat is opened in the damper device shown in FIG. 2.

FIG. 1 is an explanatory view of a Western type toilet in which a damper device to which the present invention is applied is used for opening and closing a toilet seat. FIG. 2(A) is an exploded perspective view of a damper device to which the present invention is applied and FIG. 2(B) is its cross-sectional view. FIG. 3 is a front view showing the inside of the case of a damper device to which the present invention is applied. FIG. 4 is a cross-sectional view of a turnable shaft of a damper device to which the present invention is applied. FIGS. 5(A) through 5(D) are explanatory views showing different states of a sealed space during an erected toilet seat is being closed in the damper device shown in FIG. 2. FIG. 5(A) shows the state where the toilet seat 5 is at its completely opened position, FIG. 5(B) shows the state where the toilet seat 5 is closed to a midway position, FIG. 5(C) shows the state where the toilet seat 5 is completely closed, and FIG. 5(D) is a cross-sectional view showing the state where the toilet seat 5 is at the position shown in FIG. 5(B). FIG. 6(A) through 6(D) are explanatory views showing different states of the sealed space during a closed toilet seat is being opened in the damper device shown in FIG. 2. FIG. 6(A) shows the state where the toilet seat 5 is at its closed position, FIG. 6(B) shows the state where the toilet seat 5 is opened to a midway position, FIG. 6(C) shows the state where the toilet seat 5 is completely opened, and FIG. 6(D) is a cross-sectional view showing the state where the toilet seat 5 is at the position shown in FIG. 6(B).

A Western type toilet stool 1 shown in FIG. 1 includes a main body 2 of a toilet stool, a water tank 3, a toilet lid 6, a toilet seat unit 4 and the like. The toilet seat unit 4 is provided with a toilet seat 5 and a main body cover 7. A damper device 10 shown in FIG. 2 is incorporated in the inside of the main body cover 7.

In FIGS. 2(A) and 2(B), the damper device 10 is provided with a closed-end cylindrical casing 11, a turnable shaft 12 (shaft body) inserted into the inside of the casing 11, and a cover 13 in which an opening 130 through which the end part of the turnable shaft 12 passes is formed at its center portion. A flange shaped protruded part 131 is formed at one end in the axial direction of the outer periphery of the cover 13 and an insert part 133 is formed at the other end which is inserted into a thin wall part 115 formed at the opening part of the casing 11.

The insert part 133 is formed with a large diameter part 132 near the flange shaped protruded part 131. Therefore, when the insert part 133 is inserted along an inner circumferential surface of the thin wall part 115, the insertion of the insert part 133 is prevented at the position where the axial end face of the large diameter part 132 abuts with the axial end face of the opening part of the casing 11. At this position, the horn of an ultrasonic welding device is abutted to one end 134 in the axial direction of the cover 13 and ultrasonic welding is performed. The large diameter part 132 is melted by the ultrasonic welding and the insert part 133 is pushed in the axial direction along the inner circumferential surface of the thin wall part 115. When the other end 135 in the axial direction of the cover 13 reaches to a position where the other end 135 abuts with a stepped part 113 through a metal washer 14, further insertion of the insert part 133 is prevented at the position. In other words, the stepped part 113 is formed over the whole circumference as an end part of the thin wall part 115 and the stepped part 113 is formed as the positioning part in the axial direction of the cover 13. Therefore, at this position, the large diameter part 132 of the cover 13 is welded to the inner circumferential surface of the thin wall part 115 of the casing 11 by ultrasonic welding to be capable of obtaining an oil sealing structure. In this embodiment of the present invention, various metals such as SUS, brass, aluminum and the like may be used as the metal washer 14. Further, the washer 14 is not limited to a metal and various resin materials different from the cover 13 and the casing 11 or ceramic may be used as the washer 14.

A large diameter part 126 is formed at an approximately center position in the axial direction of the turnable shaft 12 and an O-ring fitting groove 127 is formed in the large diameter part 126 for fitting an O-ring 51 (see FIG. 2(B)). Therefore, a specified amount of oil (viscous fluid) is injected within the casing 11 while the O-ring 51 is fitted to the O-ring fitting groove 127 and then the turnable shaft 12 is inserted into the casing 11. As a result, the sealed space 20 (see FIG. 2(B)) is formed between the turnable shaft 12 and the casing 11 with oil being stored in the sealed space 20. In this embodiment of the present invention, an inner wall of the casing 11 is formed in a larger diameter through a stepped part 114 than that of the inner circumferential surface which forms the sealed space in which viscous fluid is stored. This inner wall of the casing 11, i.e., the inner circumferential surface faces a large diameter part 126 of the turnable shaft 12 that is the shaft body. An axial end face of the large diameter part 126 of the turnable shaft 12 abuts with the stepped part 114 of the casing 11 and thus the stepped part 114 serves as a restricting part for the insertion of the turnable shaft 12. The stepped part 114 serves a function of labyrinth seal which causes leaking of oil to be difficult from the sealed space 20.

In FIGS. 2(A) and 2(B) and FIG. 3, a pair of partition wall parts 112 are protruded inward in a radial direction to near the outer peripheral face of the body part 81 of the turnable shaft 12 from a cylindrical inner wall 111 of the casing 11. On the other hand, a pair of wing parts 120 are protruded from the outer peripheral face of the turnable shaft 12 and thus the sealed space 20 is partitioned into a plurality of oil chambers by the partition wall part 112 and the wing part 120 as shown in FIGS. 5(A) through 5(D) or FIGS. 6(A) through 6(D). In other words, two spaces which are partitioned by the partition wall part 112 are formed by the wing part 120 to be a first oil chamber 21 positioned on the clockwise direction CW side of the wing part 120 and a second oil chamber 22 positioned on the counterclockwise direction CCW side of the wing part 120.

An orifice 125 is formed in the wing part 120 and a check valve 30 for opening or closing the orifice 125 is mounted on the wing part 120.

In this embodiment of the present invention, a first engaging protruded part 121 and a second engaging protruded part 122 are formed in the wing part 120 on both sides of the orifice 125 which is formed in a recessed part. Therefore, the first engaging protruded part 121, the orifice 125 and the second engaging protruded part 122 are arranged in the wing part 120 in an axial direction in this order. Cut-out portions having a rectangular cross section (not shown) are formed on the outer side (front end side) in the axial direction of the first engaging protruded part 121 (the large diameter part 126 side) and on the outer side (front end side) in the axial direction of the second engaging protruded part 122. The check valve engages with the cut-out portions.

The check valve 30 is a resin molded product which includes a valve part 35 formed in a flat plate shape, a first bent part 31 and a second bent part 32. The valve part 35 is formed to be capable of covering the orifice 125 on the counterclockwise direction CCW side (one end face side) of the wing part 120. The first bent part 31 is formed so as to be extended from one end of the valve part 35 to be bent to an end face side in the clockwise direction CW of the wing part 120 (the other end face side) through the outside of the first engaging protruded part 121 and is capable of engaging with the first engaging protruded part 121. The second bent part 32 is formed so as to be extended from the other end of the valve part 35 to be bent to the end face side in the clockwise direction CW of the wing part 120 through the outside of the second engaging protruded part 122 and is capable of engaging with the second engaging protruded part 122. The first and the second bent parts 31, 32 are respectively formed in a U-shape and separated from the wing part 120 on the end face side in the counterclockwise direction CCW.

The check valve 30 which is constructed described above is mounted to the wing part 120 so that the check valve 30 can be displaced in a peripheral direction by the first and the second engaging protruded parts 121, 122 being positioned on the inner side of the first and the second bent parts 31, 32. Further, in the state that the turnable shaft 12 is inserted inside of the casing 11, the check valve 30 is supported from both sides in the axial direction by the inside bottom of the casing 11 and the large diameter part 126 of the turnable shaft 12.

As shown in FIG. 3, the tip ends of a pair of partition wall parts 112 which are protruded from the cylindrical inner wall 111 of the casing 11 are formed such that respective end faces facing the outer peripheral face of the turnable shaft 12 are formed in a circular arc shape so as to be brought into face contact with the outer peripheral face of the turnable shaft 12. Further, the cylindrical inner wall 111 is provided with large diameter bore parts 68 with a bore diameter of "▯1" which allows a gap space to be formed to the check valve 30, and small diameter bore parts 69 with a bore diameter of "▯2" which is smaller than the diameter of "▯1" of the large diameter bore part 68. The small diameter bore parts 69 are capable of being brought into tight contact with the check valve 30. The large diameter bore parts 68 and the small diameter bore parts 69 are disposed at a point symmetry with the rotation axis of the turnable shaft 12 as a center. The large diameter bore parts face the check valves 30 when the toilet seat 5 is completely opened (erected state). At this time, as shown in FIG. 5(A), a small gap space "G2" is formed between the large diameter bore part 68 and the check valve 30 and viscous fluid is capable of passing through the gap space "G2".

The turnable shaft 12 is, as shown in FIG. 4, provided with three different diameter portions in its body part 81, in other words, small diameter parts 87, middle diameter parts 88, and large diameter parts 89 which are respectively disposed at a point symmetry with the rotation axis of the turnable shaft 12 as a center. The small diameter parts 87 are the smallest diameter portions (▯3) and are positioned to face the tip end faces of the partition wall parts 112 when the toilet seat 5 is completely opened (erected state). At this time, as shown in FIG. 5(A), a small gap space "G4" is formed between the partition wall part 112 and the small diameter part 87, and the viscous fluid is capable of passing through the gap space "G4".

The middle diameter parts 88 are a slightly larger diameter portion (▯4) than the small diameter parts 87 and face the tip end faces of the partition wall parts 112 when the toilet seat 5 is inclined to some extent in a closing direction. At this time, as shown in FIG. 5(B), there is no gap space between the middle diameter parts 88 and the tip end faces of the partition wall parts 112. In other words, the inner diameter formed by a pair of the partition wall parts 112 is set to be the same dimension with the outer diameter of the middle diameter parts 88.

The large diameter parts 89 are a slightly larger diameter portion (▯5) than the middle diameter parts 88 and face the tip end faces of the partition wall parts 112 while the toilet seat 5 moves from a position just before closed to the completely closed position. The large diameter parts 89 are constructed such that the partition wall parts 112 are further brought into tight contact with the large diameter parts 89 to apply a large braking power to the turnable shaft 12 as shown in FIG. 5(C). In an embodiment of the present invention, as shown in FIG. 4, a connecting part 81*a* between the small diameter part 87 and the middle diameter part 88 is formed in a straight line manner and a connecting part 81*b* between the middle diameter part 88 and the large diameter part 89 is also formed in a straight line manner.

In this embodiment of the present invention, an ultrasonic welding is performed in the mode that the toilet seat 5 is completely opened. In the mode that the toilet seat 5 is completely opened, the gap spaces "G2" are formed between the large diameter bore parts 68 and the check valves 30, and the gap spaces "G4" are formed between the partition wall parts 112 and the small diameter parts 87. Therefore, when a ultrasonic welding is performed in this state, welding between the large diameter parts 68 and the check valves 30 is prevented and welding between the partition wall parts 112 and the small diameter parts 87 is prevented.

An operation will be described below in the case that a toilet seat is mechanically connected to the turnable shaft 12 of the damper device 10 which is constructed as described above.

In the damper device 10 in accordance with an embodiment of the present invention, when an operation for turning down the toilet seat at an erected position is performed, as shown in FIGS. 5(A), 5(B) and 5(C), the turnable shaft 12 turns in the counterclockwise direction CCW while the casing 11 is fixed. In this case, the wing part 120 narrows the second oil chamber 22 while turning in the counterclockwise direction CCW. As a result, oil in the second oil chamber 22 is pressurized and going to move to the first oil chamber 21. Therefore, the check valve 30 is displaced in the clockwise direction CW by the pressure and thus the valve part 35 is pressed on the end face on the counterclockwise direction CCW side of the wing part 120 and the value of the gap space "G1" becomes to be zero. In other words, the orifice 125 is closed by the valve part 35.

When the turnable shaft 12 is located at the position shown in FIG. 5(A), the check valves 30 face the large diameter bore parts 68 with the gap space "G2" therebetween and the partition wall parts 112 face the small diameter parts 87, 87 with the gap space "G4" therebetween, and thus the toilet seat 5 is moved easily.

After that, when the turnable shaft 12 comes to the position shown in FIG. 5(B), the partition wall parts 112 abut with the middle diameter parts 88 and the value of the gap space "G4" becomes zero. Therefore, the turnable shaft 12 turns in the counterclockwise direction CCW while the outer peripheral face of the turnable shaft 12 slides on the tip end face of the partition wall part 112. Simultaneously, the check valves 30 begin to face the small diameter bore parts 69 and the value of the gap space "G2" therebetween becomes small. Therefore, the oil in the first oil chamber 21 moves to the second oil chamber 22 through a small gap space formed between the cylindrical inner wall 111 of the casing 11 and the check valve 30. Accordingly, a heavy load state is obtained by the flow resistance of the oil to generate a braking force and thus the toilet seat 5 can be closed gradually.

In addition, when the turnable shaft 12 turns in the counterclockwise direction CCW to reach to the position shown in FIG. 5(C), the check valves 30 abut with the small diameter bore parts 69 and the value of the gap space "G2" becomes zero. Simultaneously, since the tip end faces of the partition wall parts 112 are brought into tight contact with the large diameter parts 89, a large braking force is generated and thus malfunction such as the occurrence of collision noise or damage, which is generated by the toilet seat 5 colliding vigorously to the main body 2 of the toilet stool can be prevented.

On the other hand, when an operation is performed that is going to raise the toilet seat which is closed, the turnable shaft 12 turns in the clockwise direction CW while the casing 11 is fixed as shown in FIGS. 6(A), 6(B) and 6(C). In this case, the wing part 120 narrows the first oil chamber 21 while turning in the clockwise direction CW. As a result, the oil in the first oil chamber 21 is pressurized and going to move to the second oil chamber 22. Therefore, the check valve 30 is displaced in the counterclockwise direction CCW by the pressure and thus the valve part 35 is separated from the end face on the counterclockwise direction CCW side of the wing part 120 and the gap space "G1" is formed.

Further, the value of the gap space "G2" between the check valve 30 and the cylindrical inner wall 111 of the casing 11 becomes gradually larger from zero and the value of the gap space "G4" between the tip end faces of the partition wall parts 112 and the body part 81 of the turnable shaft 12 also becomes gradually larger from zero. As a result, the viscous fluid in the first oil chamber 21 moves to the second oil chamber 22 through the gap spaces "G1", "G2" and "G4". Therefore, the viscous fluid in the first oil chamber 21 is not pressurized so much and thus its resistance force is small. Accordingly, the toilet seat 5 can be opened with a little force.

As described above, in the damper device 10 in accordance with an embodiment of the present invention, the casing 11 is provided with the stepped part 113 as a positioning part in the axial direction of the cover 13 and the large diameter part 132 is welded on the inner circumferential surface of the thin wall part 115 by ultrasonic welding and the cover 13 is positioned by the stepped part 113. In the damper device having the construction as described above, even when the inner circumferential surface of the thin wall part 115 is melted at the time of ultrasonic welding between the large diameter part 132 and the inner circumferential surface of the thin wall part 115, the cover 13 is positioned by the stepped part 113 and thus prevented from being pushed furthermore in the axial direction. In other words, the cover 13 is prevented from being pushed and prevented from entered into the sealed space. Therefore, the gap space between the turnable shaft 12 disposed in the sealed space and the end face of the cover 13 is stably formed in a designed dimension and thus dispersion of damper operation can be restricted.

In an embodiment of the present invention, the cover 13 is engaged with the stepped part 113 through a metal washer 14. Therefore, since vibration energy at the time of ultrasonic welding is cut off by the metal washer 14, transmission of the vibration energy to the casing 11 side can be surely prevented. Accordingly, since the casing 11 is not melted and crushed in the axial direction, the cover 13 can be prevented from being pushed in the axial direction.

In addition, in an embodiment of the present invention, the metal washer 14 is disposed so as to be adjacent to the end face of the turnable shaft 12 in the axial direction. In other words, since the metal washer 14 is disposed at a boundary portion between the end face of the turnable shaft 12 and the cover 13, concentration of vibration energy to the boundary portion is prevented and thus welding between the end face of the turnable shaft 12 and the cover 13 can be surely restricted. Further, wear between the end face of the turnable shaft 12 and the cover 13 can be prevented by the metal washer 14.

In addition, in an embodiment of the present invention, ultrasonic welding is performed at a position where the partition wall parts 112 face the small diameter parts 87 of the body part 81 with the gap spaces "G4" therebetween and the check valves 30 face the large diameter bore parts 68, 68 of the cylindrical inner wall 111 with the gap spaces "G2" therebetween. Therefore, welding between the partition wall parts 112 and the small diameter parts 87 and welding between the check valves 30 and the large diameter bore parts 68 are prevented.

Further, in an embodiment of the present invention, the cross-sectional shape of the cylindrical inner wall 111 in a direction perpendicular to the axial direction is provided with the large diameter bore parts 68 and the small diameter bore parts 69 in the circumferential direction and a gap space between the cylindrical inner wall 111 and the check valve 30 is varied along the circumferential direction. In addition, the cross-sectional shape of the body part 81 in a direction perpendicular to the axial direction is provided with the large diameter parts 89 and the small diameter parts 87 in the circumferential direction and a gap space between the body part 81 and the partition wall part 112 is varied along the circumferential direction. Concretely, the gap space between the cylindrical inner wall 111 and the check valve 30 and the gap space between the body part 81 and the tip end face of the partition wall part 112 are respectively formed smaller so as to cope with increasing of a turning torque according to the closing operation of the toilet lid 6 which is connected to the damper device 10. Therefore, a bumper torque is increased to be capable of slowly turning the toilet lid 6 at an equal speed and thus damage due to collision to the main body 2 of a toilet stool can be prevented.

Figure 7:
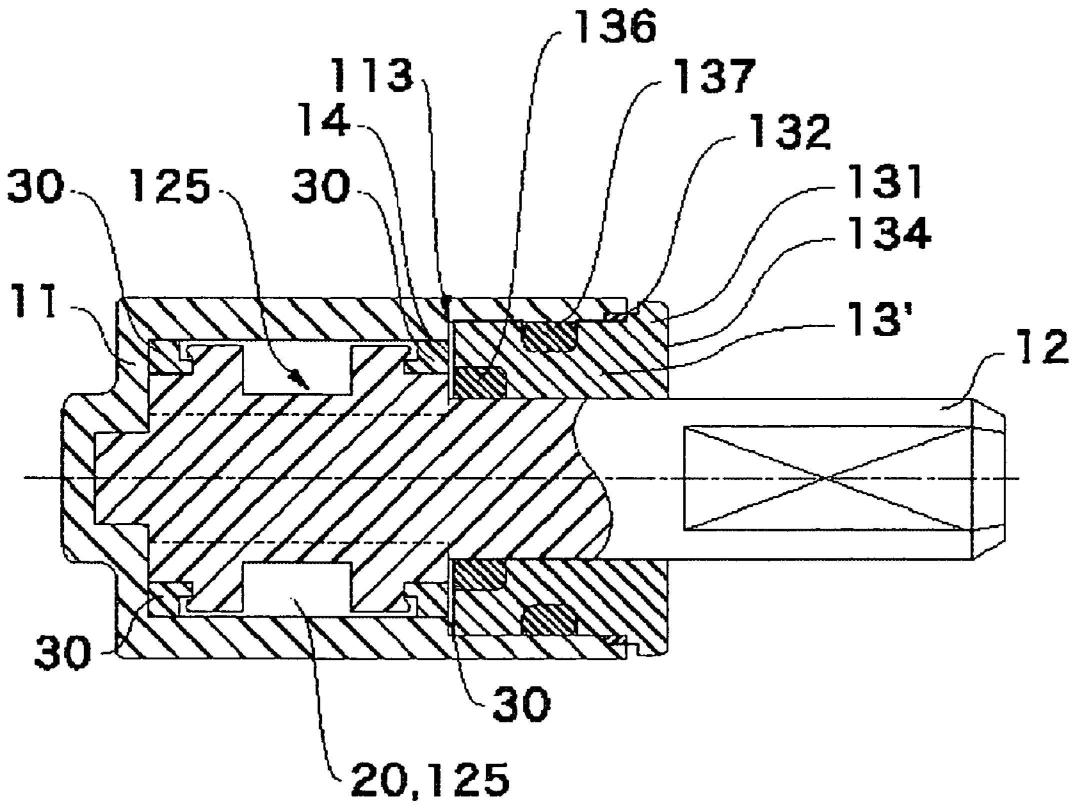
FIG. 7 is a cross-sectional view of a damper device in accordance with another embodiment of the present invention.

FIG. 7 is a cross-sectional view of a damper device in accordance with another embodiment of the present invention. In the embodiment of the present invention described above, the large diameter part 126 is formed at a substantially middle position in the axial direction of the turnable shaft 12. However, the large diameter part 126 is not necessarily formed. In other words, as shown in FIG. 7, a substantially middle portion in the axial direction of the turnable shaft 12 may be formed in the same dimension as the outer diameter of the portion which is protruded outward from a cover 13'. In this case, O-rings 136, 137 are respectively disposed on the inner circumferential face and the outer peripheral face of the cover.

Further, in an embodiment of the present invention described above, the casing 11 is disposed as a fixed side member and the turnable shaft 12 disposed inside of the casing 11 is connected to the toilet lid 6. However, the turnable shaft is arranged as a fixed side member and the casing 11 may be disposed as a turning side member.

In addition, the damper device to which the present invention is applied may be used as a damper device for various equipments as well as a damper device for a toilet seat and a toilet lid.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A damper device comprising:

a casing comprising a cylindrical inner circumferential surface and an opening;

a shaft body located in a cylindrical space of the casing and supported in a freely turnable manner;

a cover adapted for sealing the casing;

viscous fluid which is stored in a sealed space formed between the shaft body and the casing; and a metal washer disposed between the casing and the cover;

wherein the metal washer is made of material different from the cover;

wherein the cylindrical inner circumferential surface of the casing comprises:

a first inner circumferential surface which forms the sealed space in which the viscous fluid is stored;

a second inner circumferential surface which faces a large diameter part of the shaft body; and a third inner circumferential surface along which an insert part formed in the cover is inserted into the casing;

wherein the casing further comprises:

a first engagement part which (1) is formed on an axially facing surface of a step on the third inner circumferential surface of the casing, (2) engages with the cover, and (3) is used as an ultrasonically welded part with the cover; and a second engagement part which is formed on an axially facing surface of a step between the second inner circumferential surface and the third inner circumferential surface of the casing at a position, in an axial direction of the shaft body, so as to be further from the opening of the casing than the first engagement part, and which is used as a positioning part in the axial direction for the cover;

wherein the shaft body further comprises:

a large diameter part which is positioned, in the axial direction, so as to be further from the opening of the casing than the second engagement part of the casing; and an O-ring for sealing is disposed between the second inner circumferential surface of the casing and the large diameter part of the shaft body; and wherein the metal washer is disposed between the second engagement part of the casing and the cover, so that a position of the cover, in the axial direction, is determined by the second engagement part of the casing via the metal washer when the first engagement part is ultrasonically welded with the cover.

2. The damper device according to claim 1, further comprising:

at least an inwardly protruded portion which is formed so as to be protruded inward from the inner circumferential surface of the casing such that a gap space is formed between a body part of the shaft body and the inwardly protruded portion.

3. The damper device according to claim 2;

wherein a cross-sectional shape in a direction perpendicular to the axial direction of the body part of the shaft body is formed in a non-circular shape so that a gap space between the inwardly protruded portion of the casing and the body part of the shaft body is varied along a circumferential direction.

4. The damper device according to claim 2, further comprising:

at least an outwardly protruded portion which is formed so as to be protruded outward from the body part of the shaft body such that a gap space is formed between the inner circumferential surface of the casing and the outwardly protruded portion.

5. The damper device according to claim 4;

wherein a cross-sectional shape in a direction perpendicular to the axial direction of the inner circumferential surface of the casing is formed in a non-circular shape so that a gap space between the outwardly protruded portion of the shaft body and the inner circumferential surface of the casing is varied along a circumferential direction.

6. The damper device according to claim 1, further comprising:

at least an inwardly protruded portion which is formed so as to be protruded inward from the inner circumferential surface of the casing such that a gap space is formed between a body part of the shaft body and the inwardly protruded portion; and at least an outwardly protruded portion which is formed so as to be protruded outward from the body part of the shaft body such that a gap space is formed between the inner circumferential surface of the casing and the outwardly protruded portion at a position where the gap space is formed between the inwardly protruded portion and the body part of the shaft body.

7. The damper device according to claim 1;

wherein a first stepped part is formed between the first inner circumferential surface and the second inner circumferential surface so that the second inner circumferential surface has a larger diameter than a diameter of the first inner circumferential surface, and wherein a second stepped part is formed between the second inner circumferential surface and the third inner circumferential surface so that the third inner circumferential surface has a larger diameter than a diameter of the second inner circumferential surface.

8. A damper device comprising:

a casing comprising a cylindrical inner circumferential surface and an opening;

a shaft body positioned in a cylindrical space of the casing;

a cover adapted for sealing the casing; and a metal washer disposed between the casing and the cover, wherein the metal washer is made of material different from the cover;

wherein the cylindrical inner circumferential surface of the casing comprises:

a first inner circumferential surface which forms the sealed space in which the viscous fluid is stored;

a second inner circumferential surface which faces a large diameter part of the shaft body; and a third inner circumferential surface along which an insert part formed in the cover is inserted into the casing;

wherein the casing further comprises:

a first engagement part which (1) is formed on an axially facing surface of a step on the third inner circumferential surface of the casing, (2) engages with the cover, and (3) is used as an ultrasonically welded part with the cover; and a second engagement part which is formed on an axially facing surface of a step between the second inner circumferential surface and the third inner circumferential surface of the casing at a position, in an axial direction of the shaft body, so as to be further from the opening of the casing than the first engagement part, and which is used as a positioning part in the axial direction for the cover;

wherein the shaft body further comprises:

a large diameter part which is positioned, in the axial direction, so as to be further from the opening of the casing than the second engagement part of the casing; and an O-ring for sealing is disposed between the second inner circumferential surface of the casing and the large diameter part of the shaft body; and wherein the metal washer is disposed between the second engagement part of the casing and the cover, so that a position of the cover, in the axial direction, is determined by the second engagement part of the casing via the metal washer when the first engagement part is ultrasonically welded with the cover.

* * * * *